(12) United States Patent
Bhogal et al.

(10) Patent No.: US 7,543,322 B1
(45) Date of Patent: Jun. 2, 2009

(54) METHOD FOR ENHANCED EVENT SPECIFIC FEATURES ON PERSONAL VIDEO RECORDERS

(75) Inventors: Kulvir S Bhogal, Pflugerville, TX (US); Greg J Boss, American Fork, UT (US); Rick A Hamilton, III, Charlotsville, VA (US); Brian M O'Connell, Cary, NC (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/115,781

(22) Filed: May 6, 2008

(51) Int. Cl.
*H04N 5/445* (2006.01)

(52) U.S. Cl. .............................. 725/46; 725/38; 725/39; 725/40; 725/41; 725/52

(58) Field of Classification Search .................... 725/46, 725/58, 40, 41, 43, 38, 39, 47, 52
See application file for complete search history.

(56) References Cited

U.S. PATENT DOCUMENTS

| | | | | |
|---|---|---|---|---|
| 6,144,375 A | * | 11/2000 | Jain et al. ................... | 715/251 |
| 7,383,563 B1 | * | 6/2008 | Rashkovskiy ................ | 725/58 |
| 2005/0147380 A1 | * | 7/2005 | Ikegami et al. ............... | 386/52 |
| 2008/0066111 A1 | * | 3/2008 | Ellis et al. .................... | 725/57 |

* cited by examiner

*Primary Examiner*—Christopher Kelley
*Assistant Examiner*—Timothy R Newlin
(74) *Attorney, Agent, or Firm*—Cantor Colburn LLP; Justin Dillon

(57) ABSTRACT

A method for enhanced presentation of sports audio video (A/V) content, the method includes: receiving a user's preferences for sports related electronic program guide (EPG) presentation, and sporting event viewing and recording; inferring additional user preferences from the user's actions and behavior; determining if a circumstance has occurred in the sporting events being monitored in the EPG, or in the process of being recorded or stored that will trigger a change in at least one of: the EPG, the recording of the sporting events, or the sporting events being stored; changing at least one of: the EPG, the recording of the sporting events, or the one or more sporting events being stored in response to the triggering circumstance; and wherein the determining if a circumstance has occurred is based on at least one of the following: A/V information contained in a broadcast signal, a web service, or a RSS.

1 Claim, 2 Drawing Sheets

METHOD FOR ENHANCED EVENT SPECIFIC FEATURES ON PERSONAL VIDEO RECORDERS

BACKGROUND OF THE INVENTION

1. Field of the Invention

This invention relates generally to recording devices in communication systems, and more particularly to enhanced applications and features related to digital recording devices in communication systems configured with set top boxes (STB) equipped with a digital video recorder (DVR).

2. Description of the Related Art

The availability and use of digital video and media content has grown tremendously in the last decade, and will soon virtually replace all analog transmission and recording.

A widespread application of digital video is Digital television (DTV). DTV is a telecommunication system for broadcasting and receiving moving pictures and sound by means of a digital signal, in contrast to an analog signal used by analog (traditional) TV. DTV utilizes the digital modulation of analog signal data, which is digitally compressed prior to recording or broadcast. The digitally compressed signal requires decoding by a specially designed receiver within a television set, or a standard receiver with a set-top box, or a PC fitted with a television card. Digital television has several advantages over traditional analog TV, the most significant being that digital channels take up less bandwidth space. The reduced bandwidth of a digital broadcast signal enables digital broadcasters to provide more digital channels in the same space, provide High-Definition (HD) digital service, or provide other non-television services such as pay-multimedia services or interactive services. Digital television also permits special services such as multicasting (more than one program on the same channel), electronic program guides, program identification, and program descriptions.

The Federal Communications Commission (FCC), the branch of the United States (U.S.) government that regulates the television and radio broadcast industries, has mandated that all U.S. television broadcasts will be exclusively digital as of Feb. 17, 2009. Furthermore, as of Mar. 1, 2007, all new television sets that can receive signals over-the-air, including pocket-sized portable televisions, must include digital or HDTV tuners so they can receive digital broadcasts.

Along with the recent advances in television broadcasting, consumers have been introduced to digital recording devices that utilize the latest advances in broadcasting, computing, and storage mediums. An example of a digital recording device is the digital video recorder (DVR) or personal video recorder (PVR) (herein referred to as a DVR) that records video in a digital format to a disk drive or other storage medium. Digital video recording includes stand-alone set-top boxes, and software for enabling personal computers, portable communication devices, and portable computing devices to perform video capture and playback to and from a storage or recordable medium.

DVRs provide several user advantages and enhancements to older generation recording devices such as video cassette recorders (VCRs), including convenient "time shifting". Additionally, a DVR enables "trick modes" such as pausing live TV, instant replay of scenes, chasing playback, and commercial advertising skipping. DVRs most commonly use variants of the Moving Pictures Experts Group (MPEG) compression format for encoding analog video signals.

Popular and commonly found DVR features are defined below:

1) Time shifting is the recording of programming to a storage medium to be viewed or listened to at a time more convenient to the consumer.
2) Chase play is a time shifting facility of personal video recorders that allows a user to simultaneously watch, stop or pause live television while continuing to record a program to its conclusion.
3) Instant replay is a feature of DVRs, enabling a user to quickly review recently rendered video.
4) Pausing live TV is a feature of DVRs that enables a user to stop the video and audio, and display a still frame. Often, the user may resume the audio video (A/V) content at the point they paused.
5) An Electronic Program Guide (EPG) or also an Interactive Program Guide (IPG) or Electronic Service Guide (ESG), is an on-screen guide to scheduled broadcast television programs, allowing a viewer to navigate, select, and discover content by time, title, channel, genre, etc, by use of their remote control, a keyboard, or even a phone keypad.

SUMMARY OF THE INVENTION

Embodiments of the present invention include a method for enhanced presentation of sports audio video (A/V) content, the method including receiving a user's preferences for sports related electronic program guide (EPG) presentation, and sporting event viewing and recording; inferring additional user preferences for sports related electronic program guide (EPG) presentation, and sporting event viewing and recording from the user's actions and behavior; determining if a circumstance has occurred in one or more sporting events being monitored in the EPG, or in the process of being recorded or stored that will trigger a change in at least one of: the EPG, the recording of the one or more sporting events, or the one or more sporting events being stored; wherein the determining if a circumstance has occurred is based on at least one of the following: A/V information contained in a broadcast signal, a web service, or a really simple syndication (RSS) feed; changing at least one of: the EPG, the recording of the one or more sporting events, or the one or more sporting events being stored in response to the triggering circumstance; removing recorded sports programming with a final score differential exceeding a predefined or the user specified threshold; removing recorded sports programming in which the user's favorite team lost; retaining segments of a sports recording surrounding a score change; providing real-time notification of score changes, comebacks, and upsets occurring in the one or more sporting events; wherein the type of real-time notification is inferred from a sport being watched by the user; and generating highlight recordings of the one or more sporting events.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method and system for providing an enhanced dynamically alterable electronic program guide (EPG), and digital video recording (DVR) based on user preferences and DVR inferences for real-time sporting events.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
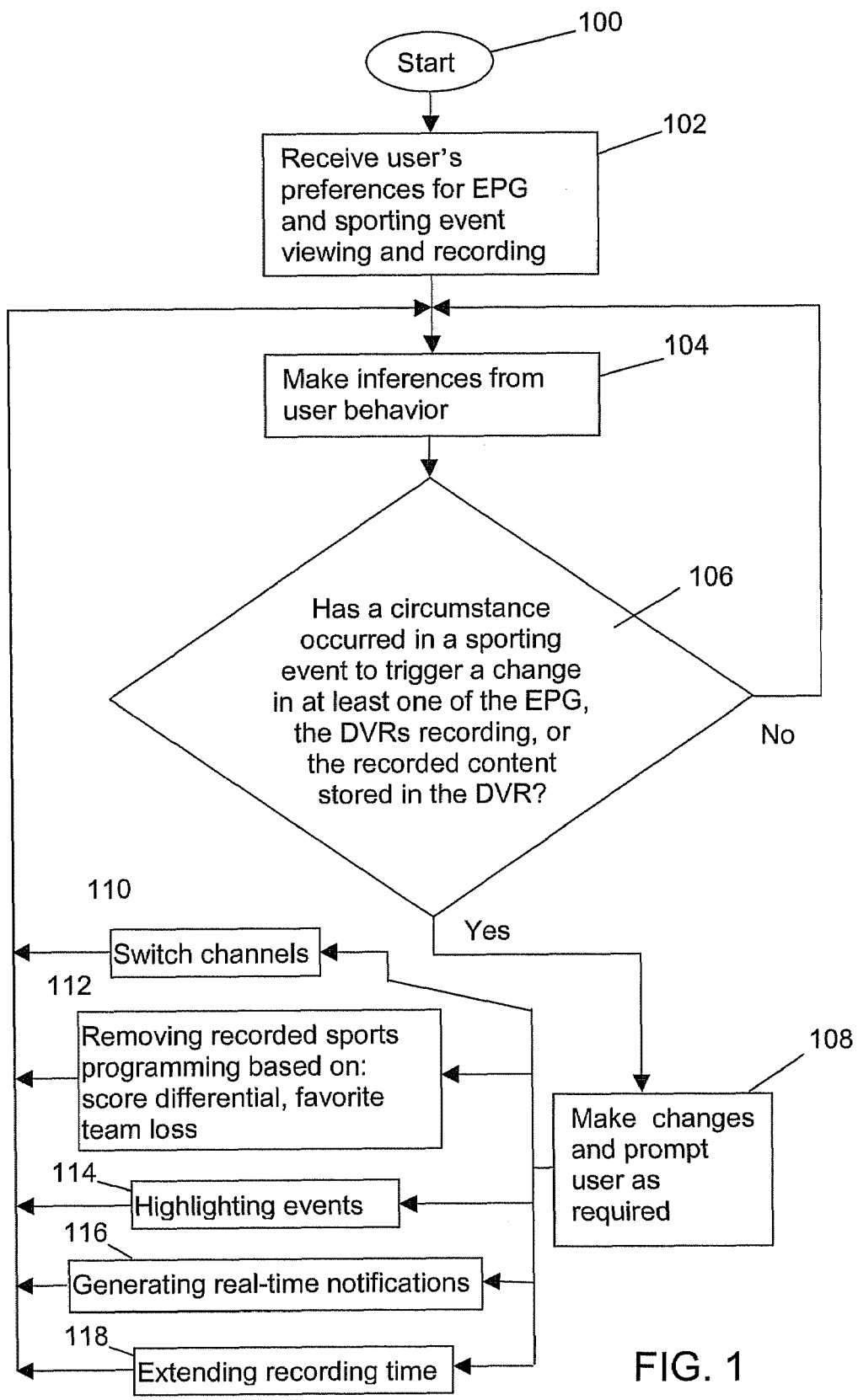
FIG. 1 illustrates a flow chart for a method for an enhanced dynamically alterable electronic program guide (EPG), and digital video recording (DVR) based on user preferences and DVR inferences for real-time sporting events according to embodiments of the invention.

The detailed description explains the preferred embodiments of the invention, together with advantages and features, by way of example with reference to the drawings.

DETAILED DESCRIPTION

Despite the many features offered by DVRs, users still lack the ability to readily locate sporting events of interest, automatically remove sporting events that are not of interest, receive notification in the event something of interest occurs in a live game or match, or reduce recorded sporting event playback to only include sections that may interest the user.

Embodiments of the invention provide methods and systems for DVRs to enhance sporting event viewing for users. Embodiments of the invention integrate available sports information into a DVR, while making modifications or augmentations to numerous standard components of a DVR, and also creating new components in a DVR. Augmented components include, but are not limited to: an electronic program guide, a recording retention component, a recorded event navigation component, a user notification component. Embodiments of the invention also introduce two new components a highlight generation component, and a sporting event information retrieval component.

The sporting event information retrieval component, which is introduced in embodiments of the invention, downloads sporting event information, such as scores and statistics, for sporting programs available for viewing on the DVR. The sporting event information is readily available on distributed networks such as the Internet. Numerous methods are available to retrieve real-time sporting event information. In one embodiment of the invention, additional metadata is included in the DVRs service provider's electronic programming guide data describing where the DVR may download sporting event information for that event. In an additional embodiment, the service provider offers a publish/subscribe messaging service in which the DVR may subscribe to sporting events of interest using a unique key for each event, as provided by the electronic programming guide metadata, and the service provider publishes and updates sporting event information to the DVR. In additional embodiments, a DVR may retrieve sporting event information through a broadcast signal's information content, a web service, really simple syndication (RSS) feed, etc. RSS is a family of web feed formats used to publish frequently updated content. The retrieved information is not limited to scores and may include other information such as: time left, game time demarcation (quarter/period/half/etc), leading scorer, and other sporting program information. The retrieved information is placed in a data store and associated with each event for future use by the DVR in the following components.

Embodiments of the invention provide enhancements to the electronic program guide and recorded shows/events components. Embodiments of the invention dynamically update EPG titles and descriptions to reflect real-time data. Among the enhancements offered by the invention are the following.

An in-progress enhancement found in embodiments of the invention provides additional information content for an in-progress sporting event. Embodiments of the invention enhance the user experience by augmenting the graphical and textual representation of the event within the electronic programming guide or recorded show section of the DVR user interface. A user interface display may be augmented with the current score, time left, etc. In embodiments of the invention, a user may be able to select the sporting event and retrieve detailed statistics about that event, such as leading scorer and other detailed event specific information.

A favorite team(s) enhancement found in embodiments of the invention provides a means for a user to denote one or many teams as their "favorites". In embodiments of the invention, the user through normal user-DVR interactions, such as a remote control, selects their favorite teams from a list of teams. In embodiments of the invention, the system modifies the textual and graphical representation of the recorded or in-progress event to inform the user of their favorite team's status. For example, in the event a user's favorite team is winning or has won a display representation may have a blue background. In the event their favorite team is losing or has already lost the display background may be red. Other embodiments may use emoticons such as a "smiley face" to indicating victory or a "frown face" to indicate a loss. Alternatively a user of an embodiment of the invention may disable most of the proposed enhanced services for the user's favorite teams. A user who closely follows a team may be time-shifting the game and would prefer to discover the outcome by watching the sporting event to completion, without a "spoiler" indicator (background colors, emoticons, etc.).

A criteria enhancement offered by embodiments of the invention allows a user to specify that only "close" sporting events or matches be listed in an EPG, for example those in which the score is presently balanced between the two teams. In embodiments of the invention, the user may select the score differential for each sport that constitutes an interesting game for that user. Other embodiments may have reasonable defaults. Sporting events with scores outside that differential are not listed in the filtered programming guide.

In embodiments of the invention, an auto switching feature may be offered that utilizes the aforementioned favorite team and criteria enhancements to automatically switch channels to show those events and segments that are ascertained to be the most interesting to the user. For example, in the event a user is interested in three sports contests occurring at the same time, and their DVR has only one or two tuners, embodiments of the invention determine which one or two events to show and time-shift based on changes in scores (e.g., football game score changes from 20-21 to 23-21), and also based on the user's specified favorite teams criteria. Weighted lists may be employed to determine the switching frequency and targets. Embodiments of the invention combine all available sources (Internet, RSS, web services, EPG data) with user preferences to determine an optimal audio and video switching strategy.

In general, the recording retention component of a DVR may automatically cancel or delete recorded content. For example, a typical DVR may have recorded material deleted due to a user request, space constraints, or due to other internal or external stimuli. Embodiments of the invention modify the recording retention component with additional criteria for expunging content.

Embodiments of the invention provide user selectable options in the event a televised game or match's score is unbalanced or lopsided. In embodiments of the invention, a recorded lopsided game or match may be automatically deleted from the DVR's storage in response to a user's preference to only watch games whose final scores are within a specified differential. In an embodiment, the user may select individual differentials for each sport that constitutes an interesting game for that user. Other embodiments may have reasonable defaults for differentials. Sporting events with final scores outside the specified differential are automatically expunged from the DVR's storage medium. In an alternative embodiment, lopsided games may have a majority of the content purged, and only the final minutes are maintained so as to provide a summary of the game or event. In additional embodiments, the relative score in a contest may be used as a DVR's criterion for removing, demoting or promoting games in a retention list in a storage media (which events to keep, which to delete based on space requirements, time in queue, etc).

Embodiments of the invention provide a highlights only recording feature in a DVR. In a highlights mode, recording and storing of segments would only occur when there is a change in a game's or match's score according to DVR defaults or user preferences. Therefore, only those segments of the event where a change in score occurred will be kept in the DVRs storage medium. The highlight feature allows a user to see the key points of a game where scoring was achieved in a summary fashion. The highlight recording may also be maintained in addition to a full recording.

An additional user selectable feature is a favorite loss function. With the favorite loss function, a DVR may automatically eliminate sporting events from the DVRs storage medium after a user's favorite team(s) has lost. The selection of favorite teams may be similar to those methods described in the favorite team(s) enhancement sub-section above. The favorite loss function is of use to user's who do not want to watch a favorite team lose.

Embodiments of the invention offer enhancements to a DVR's recorded program navigation component. Embodiments of the invention enhance DVR navigation (visual search—fast forwarding, rewinding, etc), by overlaying sporting event information during a visual search. For example, as a user is fast-forwarding through a sporting event, the DVR may overlay the score of the sporting event at the instant being rendered by the DVR. The score overlay enables the user to locate the time period of the event that may be of interest to them, for example when a game was tied.

A user notification component provided by embodiments of the invention notifies a user of game or match of real-time events that may be of interest to the user. The type of real-time notification is inferred from a sport being watched by the user Among the notifications provided by embodiments of the invention are as follows:

A score notification by a DVR, according to embodiments of the invention, may notify the user of a sporting event score by overlaying text on the currently rendered video. In an embodiment, a user may select which sporting events to enable display of score updates from the electronic programming guide. Other embodiments may infer sporting event interest from the user's favorite team selections. In DVRs with multiple tuners, in the event the user is watching previously recorded programming, or live television on one tuner, and the DVR is recording a sporting event on another tuner, the DVR may prompt the user to ascertain if they would like to watch the last 30, 60 or some number of seconds leading up the score. If the user selects yes, the DVR may pause the currently viewed program, and replay the selected number of previous seconds from the sporting event. Upon completion, the DVR may return the user to the previously viewed program they were watching.

A comeback notification by a DVR, according to embodiments of the invention, may notify a user of an ongoing sporting event in which a score first exceeded a specified differential, and then later the score returned below a separate differential. In sporting terms, such a series of events is referred to as a comeback. Some users may find these particular sporting events compelling to watch, and would like to be notified that such event is underway. In other embodiments, the DVR may automatically record such sporting events once a comeback is detected.

An upset notification by a DVR, according to embodiments of the invention, may notify the user of an ongoing sporting event in which the team predicted to be victorious is in a losing position. In an embodiment offering upset notification, additional information, such as "point spreads," may be downloaded to discover which teams or participants are predicted to win the sporting events or matches. In sporting events, the "point spread" is a number determined by market forces, and indicates the expected point difference between teams in a sporting event. If the team who is expected to lose by a pre-selected amount is presently winning the sporting event, and the amount of time left within the game is below a specified threshold, then the user may be notified that an upset is potentially in progress. Some users may find upsets compelling to watch, and would like to be notified that such an event is occurring. In additional embodiments, a DVR may automatically record a sporting event once an upset is likely.

Embodiments of the invention provide an extended recording time component. The extended time component automatically adjusts the recording time for sporting events that exceed their original programming time slot. It is common for live sporting events to exceed their original programming time slot due to delays starting the sporting event or the teams participating in the event having a tie score at the end of regulation play. In some sporting events when the score is tied at the end of regulation, the game continues in what is commonly referred to as "over time". Presently, users may be frustrated when watching previously recorded live sporting events if they are unable to watch the event until completion. By retrieving metadata about the in-progress sporting event, including time remaining, score and time demarcation (period, half, etc) the DVR may extend the recording until the sporting event is complete.

Embodiments of the invention provide a highlight generation component. The highlight generation component generates a recording comprised of sporting event highlights and scores. When a DVR is recording a sporting event (either as requested by the user or inferred by user preferences), and the event retrieval system indicates an interesting event has occurred during the recording, such as a score, the DVR notes the location within the recording where the event took place. Using notation information across multiple sporting event recordings, the DVR may generate a personalized sports highlight recording for the user. The user may then request to view the highlights (as they would any recorded program), and the DVR using the stored data moves seamlessly between the recorded and noted highlights. The DVR may pad several seconds before and after the event, to put the event in meaningful context for the user. In addition, the system may display descriptive text before each highlight indicating the teams involved in the sporting event, the score, and other pertinent information.

FIG. 1 illustrates a flow chart for a method for an enhanced dynamically alterable electronic program guide (EPG), and digital video recording (DVR) based on user preferences and DVR inferences for real-time sporting events according to embodiments of the invention. Referring to FIG. 1, the process starts (block 100) with a user entering their preferences for how and when to display sports related information in an EPG, and for viewing and recording sporting events (block 102). Additionally, during use of the DVR, inferences about user preferences for sports content are made by a DVR (block 104). In the event a circumstance occurs in a sporting event to trigger a change in at least one of the EPG, the DVRs recording, or the recorded content stored in the DVR (decision block 106 is Yes), the required changes are made, and the user is prompted as required (block 108), and the use of the DVR continues. Among the changes made are the following: automatically switching the channel to a sporting event in response to the triggering circumstance (block 110); removing recorded sports programming with a final score differential exceeding a predefined or the user specified threshold (block 112); removing recorded sports programming in which the user's favorite team lost (block 112); retaining segments of a sports recording surrounding a score change (block 114); providing real-time notification of score changes, comebacks, and upsets occurring in the one or more sporting events (block 116); generating highlight recordings of the one or more sporting events (block 114); and adding additional recording time is individually and automatically allocated to the one or more sporting events in the event one or more of the sporting events exceed their scheduled recording time (block 118).

Figure 2:
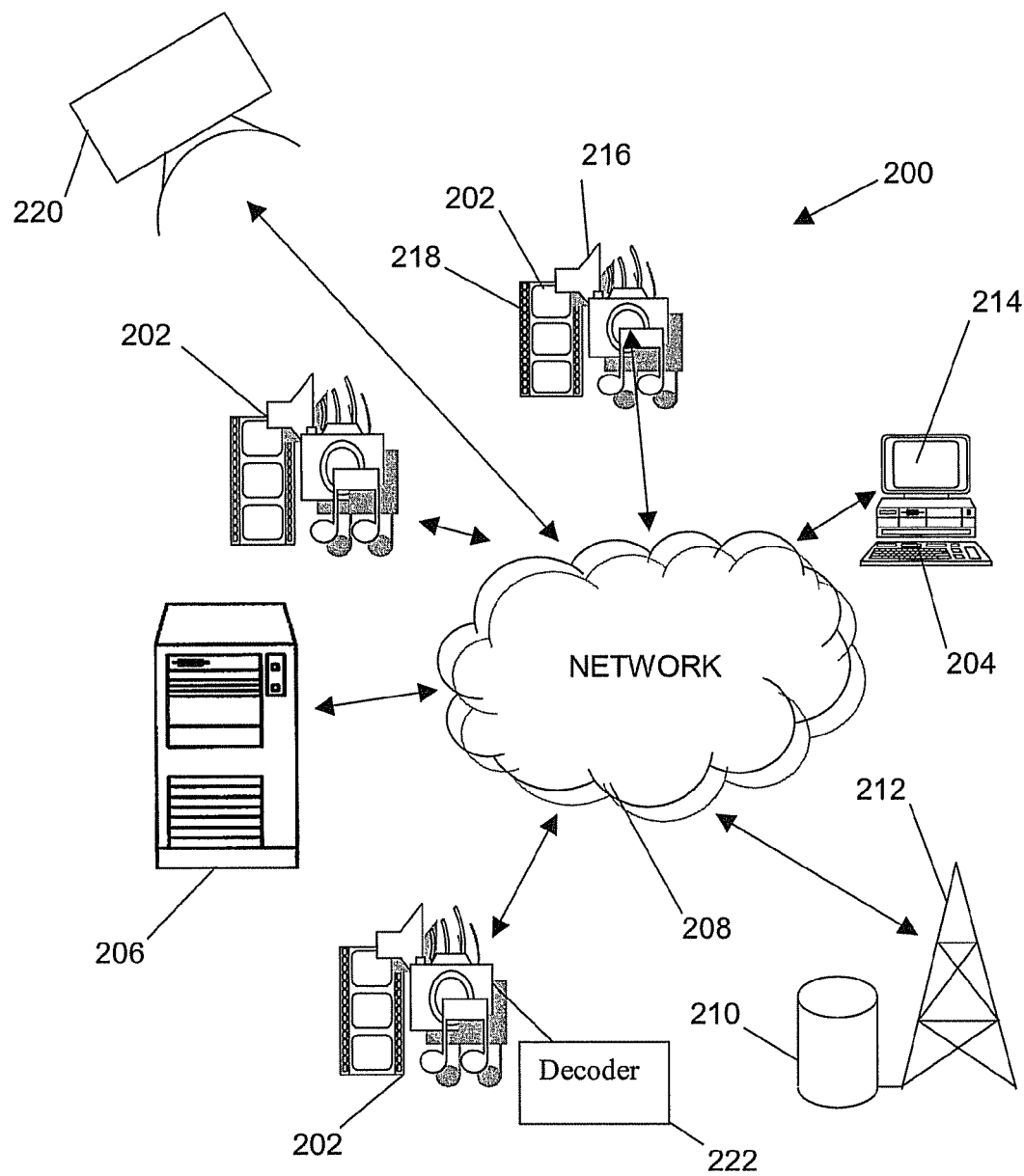
FIG. 2 illustrates a system for implementing embodiments of the invention.

FIG. 2 illustrates an exemplary system 200 for enhanced digital video recording based on user preferences and real-time circumstances in sporting events. The system 200 includes multimedia devices 202, and desktop computer devices 204 configured with digital video recording and playback capabilities 214. The multimedia devices 202 may be digital televisions, and mobile communication and entertainment devices, such as cellular phones and mobile computing devices that are wirelessly connected to a network 208. The multimedia devices 202 have video displays 218 and audio outputs 216. The multimedia devices 202 and desktop computer devices may be configured with graphical user interfaces (GUI) for the collection of user inputs, and user preferences for EPG, and for recording and playback options. The network 208 may be any type of known network including a fixed wire line network, cable and fiber optics, over the air broadcasts, satellite 220, local area network (LAN), wide area network (WAN), global network (e.g., Internet), intranet, etc. with data/Internet capabilities as represented by server 206. Communication aspects of the network are represented by cellular base station 212 and antenna 210. Decoders 222 may be externally connected to the multimedia devices 202 and desktop computers 204, integrated into the multimedia devices 202 and desktop computers 204, or contained on a smart card that is inserted into an available slot in the multimedia devices 202 and desktop computers 204.

User subscription profiles and databases for sporting event preferences for A/V content may be resident on the individual multimedia devices 202 and desktop computers 204, or stored within the server 206 or cellular base station 210. The software for running the determining and implementing sporting event preferences for A/V content may be resident on the server 206 or cellular base station 210.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for enhanced presentation of sports audio video (A/V) content, wherein the method comprises:
   receiving a user's preferences for sports related electronic program guide (EPG) presentation, and sporting event viewing and recording;
   inferring additional user preferences for sports related electronic program guide (EPG) presentation, and sporting event viewing and recording from the user's actions and behavior;
   determining if a circumstance has occurred in one or more sporting events being monitored in the EPG, or in the process of being recorded or stored that will trigger a change in at least one of: the EPG, the recording of the one or more sporting events, or the one or more sporting events being stored;
   wherein the determining if a circumstance has occurred is based on at least one of the following: A/V information contained in a broadcast signal, a web service, or a really simple syndication (RSS) feed;
   changing the EPG in response to the triggering circumstance, wherein the changing of the EPG further comprises removing or adding one or more sporting event listings in the EPG based on the sporting event's score differential, while the one or more sporting events are in progress;
   removing recorded sports programming with a final score differential exceeding a predefined or the user specified threshold;
   removing recorded sports programming in which the user's favorite team lost;
   retaining segments of a sports recording surrounding a score change;
   providing real-time notification of score changes, comebacks, and upsets occurring in the one or more sporting events;
   wherein the type of real-time notification is inferred from a sport being watched by the user; and
   generating highlight recordings of the one or more sporting events.

* * * * *